(12) United States Patent
Alberts et al.

(10) Patent No.: US 12,104,575 B2
(45) Date of Patent: Oct. 1, 2024

(54) METHOD OF CONTROLLING A WIND TURBINE AND CONTROLLER FOR A WIND TURBINE

(71) Applicant: Siemens Gamesa Renewable Energy A/S, Brande (DK)

(72) Inventors: Johannes Gerhardes Wardjan Alberts, Brøndby Strand (DK); Tommy Hastrup Knudsen, Karup J (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 115 days.

(21) Appl. No.: 17/763,708

(22) PCT Filed: Sep. 21, 2020

(86) PCT No.: PCT/EP2020/076296
§ 371 (c)(1),
(2) Date: Mar. 25, 2022

(87) PCT Pub. No.: WO2021/069200
PCT Pub. Date: Apr. 15, 2021

(65) Prior Publication Data
US 2022/0403820 A1    Dec. 22, 2022

(30) Foreign Application Priority Data
Oct. 9, 2019 (EP) .................................... 19202308

(51) Int. Cl.
*F03D 7/02* (2006.01)
(52) U.S. Cl.
CPC ......... *F03D 7/0224* (2013.01); *F03D 7/0264* (2013.01); *F05B 2270/301* (2013.01);
(Continued)

(58) Field of Classification Search
CPC ................. F03D 7/0224; F03D 7/0264; F05B 2270/301; F05B 2270/328;
(Continued)

(56) References Cited

U.S. PATENT DOCUMENTS

2011/0008166 A1    1/2011 Roed
2012/0134801 A1*   5/2012 Seki ...................... F03D 7/0224
                                                                416/1
(Continued)

OTHER PUBLICATIONS

PCT International Search Report and Written Opinion of International Searching Authority mailed Nov. 12, 2020 corresponding to PCT International Application No. PCT/EP2020/076296 filed Sep. 21, 2020.

*Primary Examiner* — Woody A Lee, Jr.
*Assistant Examiner* — Eric A Lange
(74) *Attorney, Agent, or Firm* — Schmeiser, Olsen & Watts LLP

(57) ABSTRACT

A method of controlling a wind turbine, wherein a minimum required hydraulic pressure represents a hydraulic pressure of at least one accumulator of the wind turbine which is required to pitch at least one blade of the wind turbine which is associated with the accumulator into a stop position of the wind turbine, and wherein a pitch angle represents a pitch angle of a normal of the at least one blade of the wind turbine relative to an incoming wind direction. The method includes (a) determining a minimum requirement function of the minimum required hydraulic pressure dependent on the pitch angle, (b) detecting a current hydraulic pressure in the at least one accumulator at a current pitch angle of the at least one blade, and (c) controlling the wind turbine such that the current hydraulic pressure is above the minimum required hydraulic pressure at the current pitch angle.

9 Claims, 4 Drawing Sheets

(52) U.S. Cl.
CPC .................. *F05B 2270/328* (2013.01); *F05B 2270/604* (2013.01); *F05B 2270/70* (2013.01)

(58) Field of Classification Search
CPC ............ F05B 2270/604; F05B 2270/70; F05B 2270/309; Y02E 10/72
See application file for complete search history.

(56) References Cited

U.S. PATENT DOCUMENTS

2019/0055922 A1\* 2/2019 Schwensen ............. F03D 7/047
2019/0078555 A1\* 3/2019 Kjær ..................... F03D 7/0224

\* cited by examiner

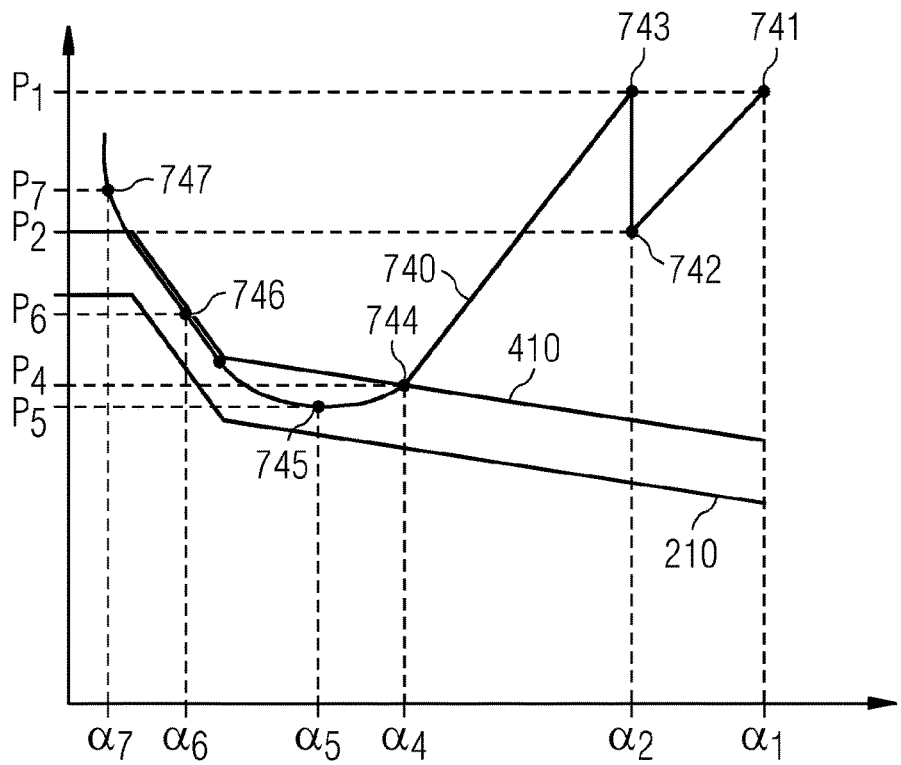
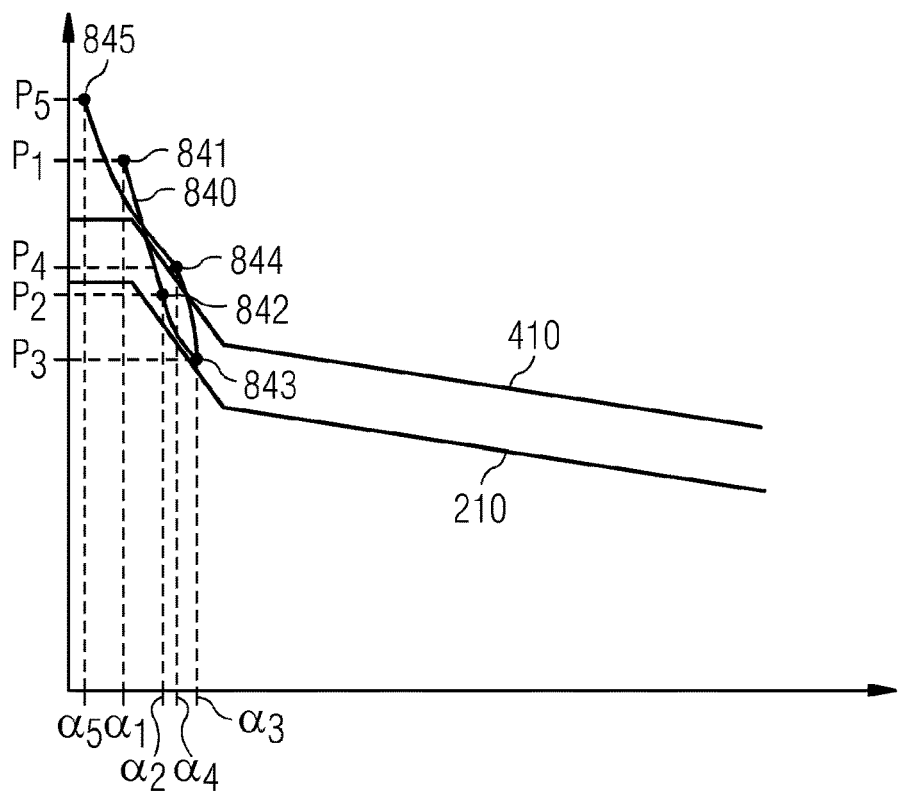

METHOD OF CONTROLLING A WIND TURBINE AND CONTROLLER FOR A WIND TURBINE

CROSS-REFERENCE TO RELATED APPLICATIONS

This application claims priority to PCT Application No. PCT/EP2020/076296, having a filing date of Sep. 21, 2020, which claims priority to EP Application No. 19202308.3, having a filing date of Oct. 9, 2019, the entire contents both of which are hereby incorporated by reference.

FIELD OF TECHNOLOGY

The following relates to a method of controlling a wind turbine. Further, the following relates to a controller for a wind turbine.

BACKGROUND

In the technical field of controlling wind turbines, it is commonly known to use hydraulic accumulators and pumps to pitch the blades. The hydraulic accumulators and pumps are dimensioned to deliver sufficient oil and pressure in almost all operation conditions. However, there might be situations where the dimensioning is close to the limit or is insufficient due to broken hardware, such as for example a broken accumulator or a broken pump. This might lead to a hydraulic pressure close to a shutdown limit that is continuously monitored by a turbine controller. The shutdown limit may be defined in each wind turbine by a pressure level at which the wind turbine may reach a safe stop position (that may be during an emergency stop) and/or at which the wind turbine may have sufficient force and speed to pitch the at least one blade during operation as well as a normal stop procedure.

When in a current wind turbine, the hydraulic pressure drops below the shutdown level, the wind turbine shuts down. The shutdown level is today monitored by a single value threshold for all pitch angles, even though the minimum pressure to achieve the two above-defined targets varies over the pitch angle.

In today's wind turbines the hydraulic system is optimized such that a minimum number of accumulators and pumps are required for operation. For rotor upgrade projects, the same hydraulic design is typically used making the design pushed more to the shutdown limit. Hence, a result may be that in some cases not sufficient pressure for a start-up sequence may be providable. Hence, a lower pitch-in speed at the start-up sequence may be necessary for keeping the pressure above the shutdown limit. This may result in increased start-up time and an increased risk for a shutdown during the start-up sequence.

Furthermore, in today's wind turbines, in case of a broken hydraulic pump, the pressure may not be kept above the shutdown limit at all times but may drop below the shutdown limit due to the fact that for example solely two of three pumps are available. Hence, a broken pump may lead to a turbine shutdown. Particularly in offshore installations, replacing a broken component may be cost and time intensive. Particularly due to weather conditions (e.g. high wind or high waves).

Therefore, in current wind turbines due to a conventional approach, the wind turbine may have long downtimes and a lower availability.

Hence, there may be a need to provide a method of controlling a wind turbine such that a low downtime and at the same time a high availability of the wind turbine may be ensured.

SUMMARY

According to a first aspect of embodiments of the invention there is provided a method of controlling a wind turbine, wherein a minimum required hydraulic pressure represents a hydraulic pressure of at least one accumulator of the wind turbine which is required to pitch at least one blade of the wind turbine which is associated with the accumulator into a stop position of the wind turbine, and wherein a pitch angle represents a pitch angle of a normal of the at least one blade of the wind turbine relative to an incoming wind direction. The method comprises determining a minimum requirement function of the minimum required hydraulic pressure dependent on the pitch angle, detecting a current hydraulic pressure in the at least one accumulator at a current pitch angle of the at least one blade, and controlling the wind turbine such that the current hydraulic pressure is above the minimum required hydraulic pressure at the current pitch angle.

The described method is based on the idea to use an active method of controlling a wind turbine in which a lost availability due to too restrict setup on the hydraulics or due to a broken hydraulic pump and/or accumulator may be reduced. Hence, an active controlling of a wind turbine causing enhanced availability times may be providable.

This may result in an increase in an energy production of a wind turbine. Therefore, a lower level cost of energy may be possible. An increased overall power production within a wind farm along with lower fatigue loads due to a higher turbulence level may result in a reduced fatigue load such that a structural design may be optimized and therefore costs may be reduced.

Additionally, this may result in the possibility that one physical component, e.g. an accumulator or a pump may be costed out. This may result in e.g. two pumps instead of three pumps or two hydraulic accumulators instead of three hydraulic accumulators. Hence, the wind turbine design may be implemented closer to the shutdown limit. Any cost-out of a component (e.g. hydraulic accumulator or hydraulic pump) may save production and maintaining costs of the wind turbine.

Normally an energy which is produced above a promised availability level is typically split between a wind turbine costumer and a wind turbine producer. An availability loss below the promised availability level is paid out by the wind turbine producer. Therefore, any availability above the promised availability level may paid out for the wind turbine producer.

The stop position of the wind turbine may denote a position of the at least one blade at which the wind turbine may not extract wind energy out of the incoming wind because the at least one blade is pitched into the incoming wind.

The normal of the at least one blade of the wind turbine may denote a direction extending perpendicular to a chord of the blade of the wind turbine. The chord is defined to be a straight line interconnecting the leading edge and trailing edge of the blade.

The pitch angle may be defined as the angle between the normal of the blade relative to the incoming wind field. Hence, a pitch angle of 0° may indicate that the blade is pitched into the incoming wind and that the blade is in an operation position. With other words the blade is in an active position or a working position. In the operation position the wind turbine may extract energy from the wind. Correspondingly, a pitch angle of 90° may indicate that the blade is pitched out of the incoming wind and that the blade is in a stop position. In the stop position the wind turbine may not extract energy out of the incoming wind. Therefore, in the stop position the blades of the wind turbine do not turn or idle (rotate at low speed).

The incoming wind direction may denote an averaged incoming wind direction which may be seen as a main direction of an incoming wind field hitting the wind turbine.

The minimum required hydraulic pressure may be based on a maximum pressure of either having sufficient oil in the at least one accumulator to reach a safe stop position of the wind turbine or having sufficient force to pitch the at least one blade at a minimum pitch adjustment speed. The minimum required hydraulic pressure may be defined to represent (in other words to follow) the maximum of the two pressures.

According to an exemplary embodiment of the invention, the method further comprises determining an offset minimum requirement function being offset to the minimum requirement function by a predetermined positive offset and representing a function of an offset minimum required hydraulic pressure dependent on the pitch angle, detecting the current hydraulic pressure in the at least one accumulator at the current pitch angle of the at least one blade, determining if the current hydraulic pressure is higher than the minimum required hydraulic pressure at the current pitch angle and lower than the offset minimum required hydraulic pressure at the current pitch angle, and controlling the wind turbine such that the current hydraulic pressure is above the offset minimum required hydraulic pressure at the current pitch angle.

Providing the predetermined positive offset may provide the possibility to enable the controller to have a certain buffer before a pressure of the minimum requirement function may be met by the hydraulic system of the wind turbine. This may result in a shutdown of the wind turbine because not enough hydraulic pressure may be present in the hydraulic system. Therefore, the wind turbine is shutdown to wait until the current pressure is above the pressure of the minimum requirement function. The buffer provided by the predetermined positive offset may provide the possibility to avoid unnecessary shutdowns and hence enlarge the availability of the wind turbine.

If the detected current hydraulic pressure is higher than the minimum required hydraulic pressure at the current pitch angle and lower than the offset minimum required hydraulic pressure at the current pitch angle, a so-called low-pressure situation may be detected. After detecting the low-pressure situation, the controlling of the wind turbine such that the current hydraulic pressure is above the offset minimum hydraulic pressure at the current pitch angle may comprise two different actions.

According to a first action according to an exemplary embodiment of the invention, the at least one blade may pitch from the current pitch angle to another pitch angle, typically towards a stop position of the at least one blade. In the stop position the at least one blade is pitched out of the incoming wind direction. Hence, the at least one blade pitches out of the wind. After pitching out, the controller controls the at least one blade such that the pitch angle is not changed until the current pressure at the current pitch angle is above the offset minimum requirement function again. Afterwards, the wind turbine may be set back to normal operation.

According to a second action according to a further exemplary embodiment of the present invention, a pitch adjustment speed of the at least one blade of the wind turbine is adapted. For example, the pitch adjustment speed towards the operation position (at a pitch angle of 0°) is lowered to prevent a shutdown and a pitch adjustment speed towards the stop position may be unaffected. This may allow the controller of the wind turbine to pitch the at least one blade out of the incoming wind at a nominal wind speed, for example in a case where a gust hits the at least one blade. Therefore, a rotor overspeed and a high component loading may be prevented because a pitching out of the at least one blade may lower the offset minimum required hydraulic pressure.

According to another example the pitch adjustment speed towards the stop position (at a pitch angle of 90°) is lowered to enable the hydraulic system to increase the current hydraulic pressure.

According to an exemplary embodiment of the invention, the minimum requirement function is determined by a section-wise linear interpolation and/or a section-wise exponential interpolation.

The interpolation may be based on different scenarios which may occur at the at least one blade of the wind turbine and which are illustrated as a required hydraulic pressure in the at least one accumulator to enable the at least one blade to be pitched from the current pitch angle to a stop position pitch angle (90°).

According to an exemplary embodiment of the invention, a distance between the minimum requirement function and the offset minimum requirement function is constant along the pitch angle.

Providing the distance constant along the pitch angle may provide the possibility to have a similar and sufficient offset buffer at each current pitch angle for enabling the controller to control the wind turbine such that the current hydraulic pressure is above the minimum required hydraulic pressure at the current pitch angle. At the same time, the time necessary for determining if the current hydraulic pressure is higher than the minimum required hydraulic pressure and lower than the offset minimum required hydraulic pressure at the current pitch angle may be kept short.

According to another exemplary embodiment of the invention, the distance between the minimum requirement function and the offset minimum requirement function may be line/limit calculated, particularly to fit the system.

According to a further embodiment of the invention, the controlling comprises an adapting of a pitch adjustment speed of at least one blade of the wind turbine.

Adapting the pitch adjustment speed may provide the possibility that the pitch adjustment speed may be dependent on a remaining time to react. Hence, on the one hand, if there is enough time left to react, for example if the current hydraulic pressure is still nearer to the offset minimum requirement function than to the minimum requirement function at the current pitch angle, the pitch adjustment speed may be kept low such that the hydraulic system may be refilled slower. On the other hand, if there is solely a short time left to react, for example if the current hydraulic pressure is nearer to the minimum requirement function than to the offset minimum requirement function at the current pitch angle, the pitch adjustment speed may be high such that the pressure drops slower in the hydraulic system and such that the hydraulic system has enough time to be refilled again.

According to a further exemplary embodiment, the adapting of the pitch adjustment speed comprises an adapting of the pitch adjustment speed towards a stop position of at least one blade of the wind turbine and/or an adapting of the pitch adjustment speed towards an operation position of the at least one blade of the wind turbine.

The stop position of the at least one blade of the wind turbine may be the position in which the at least one blade is pitched out of the wind, e.g. the position in which the current pitch angle may be 90°.

The operation position of the at least one blade of the wind turbine may be the position in which the at least one blade is pitched into the wind, e.g. the position in which the current pitch angle may be 0°.

Adapting the pitch adjustment speed towards the stop position or towards the operation position may provide the possibility to individually adapt solely the pitch adjustment speed which has to be adapted to maintain a safe operation of the wind turbine. Therefore, controlling actions of the controller which are not mandatory necessary may be inhibited.

Adapting the pitch adjustment speed towards the operation position and towards the stop position may provide the possibility to react fast on occurring pressure losses in the hydraulic system of the wind turbine. Therefore, an availability of the wind turbine may be ensured.

According to a further exemplary embodiment of the invention, the adapting of the pitch adjustment speed defines the pitch adjustment speed dependent on the current hydraulic pressure.

Defining the pitch adjustment speed dependent on the current hydraulic pressure may provide the possibility that if the current hydraulic pressure is near the minimum requirement function, the pitch adjustment speed may be slowed down such that the pressure drop decreases. Therefore, the availability of the wind turbine may be increased. If the current hydraulic pressure is near the offset minimum requirement function, the pitch adjustment speed may be maintained. Therefore, a faster pitching may be providable.

According to an exemplary embodiment of the present invention, the pitch adjustment speed dependent on the current hydraulic pressure is changed linearly or exponentially.

Changing the pitch adjustment speed linearly may provide an adapting of the pitch adjustment speed which is easy to implement and to control.

Changing the pitch adjustment speed exponentially may provide an adapting of the pitch adjustment speed which provides an individually adapted pitch adjustment speed.

According to an exemplary embodiment the pitch adjustment speed dependent on the current hydraulic pressure is changed stepwise. This may provide the possibility to adapt the pitch adjustment speed in a fast way.

According to an exemplary embodiment of the invention, towards an operation position of the at least one blade of the wind turbine, the pitch adjustment speed changes dependent on the current hydraulic pressure from 100% at the offset minimum required hydraulic pressure to 0% at the minimum required hydraulic pressure.

Changing the pitch adjustment speed towards the operation position from 100% at the offset minimum required hydraulic pressure to 0% at the minimum required pressure may ensure that the hydraulic system at a current hydraulic pressure near the shutdown level may be refilled before the pitch angle is further adapted. Therefore, a shutdown of the wind turbine may be inhibited, and the availability of the wind turbine may be increased. At the same time, when the current hydraulic pressure is near the offset minimum required pressure the pitch angle may be adapted as fast as possible. Therefore, the operation position of the at least one blade may be reached fast, and the energy production of the wind turbine may be increased.

In other words, the pitch adjustment speed may be reduced (e.g. linearly) from a nominal pitch adjustment speed of 100% to 0°, when pitching towards the operation position and when the current hydraulic pressure is below the offset minimum required hydraulic pressure at the current pitch angle.

According to an exemplary embodiment of the present invention, towards a stop position of the at least one blade of the wind turbine, the pitch adjustment speed changes dependent on the current hydraulic pressure from 50% at the offset minimum required hydraulic pressure to 0% at the minimum required hydraulic pressure.

In other words, the pitch adjustment speed may be reduced (e.g. linearly) from a nominal pitch adjustment speed of 50% to 0° when pitching towards the stop position and when no hazardous situation is detected (e.g. rotor speed close to an overspeed limit).

Changing the pitch adjustment speed towards the stop position from 50% at the offset minimum required hydraulic pressure to 0% at the minimum required pressure may ensure that the hydraulic system at a current hydraulic pressure near the shutdown level may be refilled before the pitch angle is further adapted. Therefore, a shutdown of the wind turbine may be inhibited, and the availability of the wind turbine may be increased. At the same time, when the current hydraulic pressure is near the offset minimum required pressure the pitch angle may be adapted such that an additional energy production may be ensured.

According to a further aspect of embodiments of the invention there is provided a controller for a wind turbine, wherein a minimum required hydraulic pressure represents a hydraulic pressure of at least one accumulator of the wind turbine which is required to pitch at least one blade of the wind turbine which is associated with the accumulator into a stop position of the wind turbine, and wherein a pitch angle represents a pitch angle of a normal of the at least one blade of the wind turbine relative to an incoming wind direction. The controller comprises (a) a determining device for determining a minimum requirement function determining minimum pressure values of the minimum required hydraulic pressure dependent on the pitch angle, (b) a detecting device for detecting a current hydraulic pressure in the at least one accumulator at a current pitch angle of the at least one blade, and (c) a controlling device for controlling the wind turbine such that the current hydraulic pressure is above the minimum required hydraulic pressure at the current pitch angle.

Also, the described controller is based on the idea to use an active method of controlling a wind turbine in which a lost availability due to a too restrict setup on the hydraulics or due to a broken hydraulic pump and/or accumulator may be reduced. Hence, an active controlling of a wind turbine causing enhanced availability times may be providable.

This may result in an increase in an energy production of a wind turbine. Therefore, a lower level cost of energy may be possible. An increased overall power production within a wind farm along with lower fatigue loads due to a higher turbulence level may result in a reduced fatigue load such that a structural design may be optimized and therefore costs may be reduced.

Additionally, this may result in the possibility that one physical component, e.g. an accumulator or a pump may be costed out. This may result in e.g. two pumps instead of three pumps or two hydraulic accumulators instead of three hydraulic accumulators. Hence, the wind turbine design may be implemented closer to the shutdown limit.

In the following some exemplary ideas of embodiments of the present invention are described.

In a case where the wind turbine uses at least one blade sensor for an individual pitch control (IPC) an additional component may be added to a collective pitch angle to reduce either a tilt loading or a yaw loading. If an IPC continues for a too long time, the hydraulic system of the wind turbine may be drained, and the wind turbine may reach close to the minimum required hydraulic pressure. Therefore, an IPC amplitude may be reduced in order to prevent a turbine shutdown. Hence, by controlling the wind turbine such that the current hydraulic pressure is above the minimum required hydraulic pressure determined according to an embodiment of the present invention, at the current pitch angle, the wind turbine may have an enhanced availability.

Additionally, providing the method of controlling a wind turbine according to an embodiment of the present invention may provide the possibility to cost out one of the at least two hydraulic pumps in a wind turbine (for example one of three hydraulic pumps in a direct drive wind turbine) which is solely used for start-up, shutdown, gust cases and/or redundancy. If the pitch adjustment speed may be too fast for the hydraulic system to follow, the pitch adjustment speed will be adjusted instead of shutting down the wind turbine. Hence, the robustness of the wind turbine may be increased. Hence, the availability of the wind turbine may be increased.

Furthermore, the method of controlling a wind turbine may provide the possibility to provide a robust wind turbine configuration in which during a start-up case the controller is less sensitive to a configuration error, and a design of the wind turbine being closer to its limit may result in decreased costs for the wind turbine.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein:

FIG. 7 shows a graph illustrating how controlling of the wind turbine according to a further embodiment of the present invention may prevent a shutdown of the wind turbine;

FIG. 8 shows a graph illustrating how controlling of the wind turbine according to a further embodiment of the present invention may prevent a shutdown of the wind turbine.

DETAILED DESCRIPTION

Figure 1:
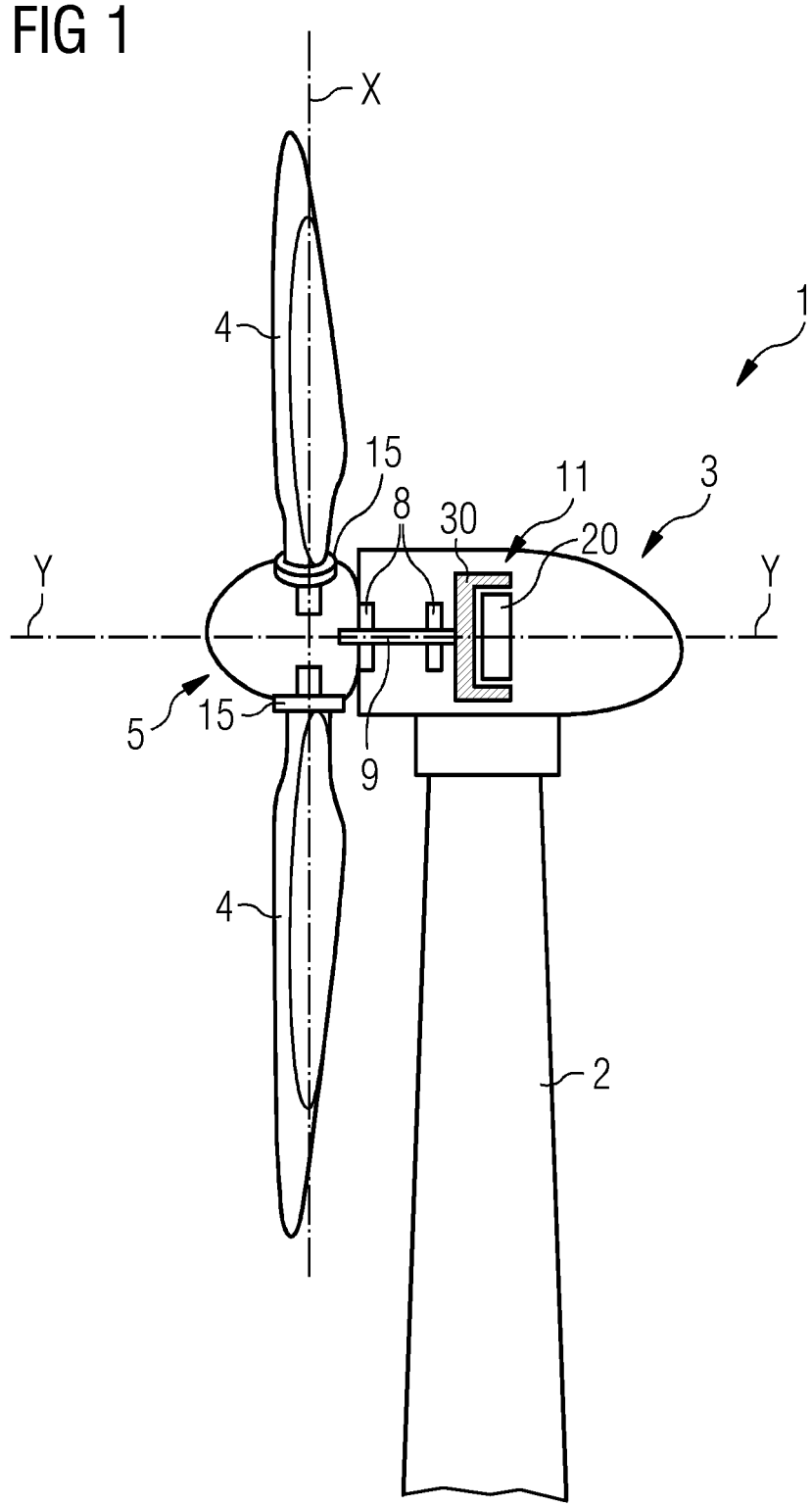
FIG. 1 shows a schematic section of a wind turbine to which the method of controlling and the controller of the present invention may be applied for controlling the wind turbine.

The illustration in the drawings is schematic. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

FIG. 1 shows a wind turbine 1 according to embodiments of the invention. The wind turbine 1 comprises a tower 2, which is mounted on a non-depicted foundation. A nacelle 3 is arranged on top of the tower 2. The wind turbine 1 further comprises a wind rotor 5 having at least one blade 4 (in the embodiment of FIG. 1, the wind rotor comprises three blades 4, of which only two blades 4 are visible). The wind rotor 5 is rotatable around a rotational axis Y. The blades 4 extend substantially radially with respect to the rotational axis Y and along a respective longitudinal axis X.

The wind turbine 1 comprises an electric generator 11, including a stator 20 and a rotor 30. The rotor 30 is rotatable with respect to the stator 20 about the rotational axis Y. The wind rotor 5 is rotationally coupled with the electric generator 11 either directly, e.g. direct drive or by means of a rotatable main shaft 9 and/or through a gear box (not shown in FIG. 1). A schematically depicted bearing assembly 8 is provided in order to hold in place the main shaft 9 and the rotor 5. The rotatable main shaft 9 extends along the rotational axis Y.

The wind rotor 5 comprises three flanges 15 for connecting a respective blade 4 to the wind rotor 5. A pitch bearing is interposed between each blade flange 15 and the respective blade 4. A hydraulic pitch actuation circuit is associated to the pitch bearings of the blades 4 for regulating the pitch angle of each blade, i.e. the angular position of each blade about the respective blade longitudinal axis X. The hydraulic pitch actuation circuit may adjust all pitch angles on all rotor blades 4 at the same time and/or individual pitching of the rotor blades 4 may be available.

The wind turbine 1 comprises a controller (not shown) with a processor and a memory. The processor executes computing tasks based on instructions stored in the memory. According to such tasks, the wind turbine in operation generates a requested power output level. Additionally, the wind turbine in operation avoids an emergency shutdown and maintains the current hydraulic pressure above the minimum required hydraulic pressure, particularly above the offset minimum hydraulic pressure.

Figure 2:
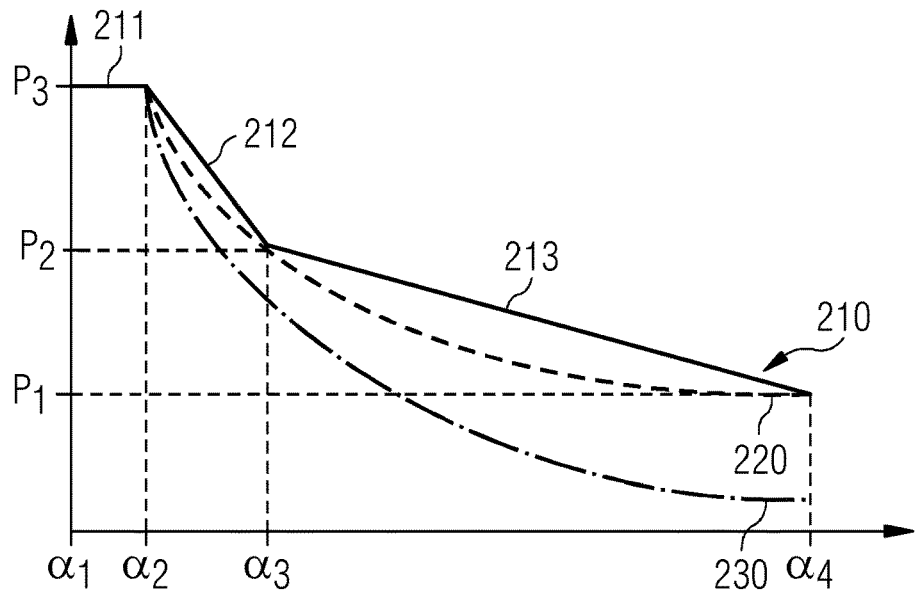
FIG. 2 shows a graph illustrating how controlling of the wind turbine according to an embodiment of the present invention is operated.

FIG. 2 shows a minimum requirement function 210, which may be generated by the controller for controlling the wind turbine 1. All functions are illustrated as pressure p dependent on pitch angel α functions. A dashed line illustrates a first pressure function 220 which is based on simulated blade forces which the hydraulic system of the wind turbine 1 needs to overcome to be able to pitch at least one blade 4 at a minimum speed. A dot-dashed line illustrates a second pressure function 230 which the hydraulic system of the wind turbine 1 needs to enable a reaching of a safe stop position. According to the embodiment shown in FIG. 2, the second pressure function 230 represents lower pressure values as the first pressure function 220, because in the situation of reaching of the safe stop position, a safety accumulator may help such that the needed pressure is lower. According to the present embodiment shown in FIG. 2, the minimum requirement function 210 is determined by a section-wise linear interpolation of the first pressure function 220.

The minimum requirement function 210 comprises a first section 211 being constant at a third pressure $p_3$ at a pitch angle range extending from a first pitch angle cu to a second pitch angle $\alpha_2$. The first pitch angle cu is 0° and represents an operation position of the at least one blade 4. In the operation position the normal of the chord of the at least one blade 4 and the incoming wind direction enclose the pitch angle cu of 0°. The minimum requirement function 210 further comprises a second section 212 and a third section 213, wherein the second section 212 extends between the first section 211 and the third section 213. The second section 212 is determined by a linear interpolation extending from the third pressure $p_3$ at the second pitch angle $\alpha_2$ to a second pressure $p_2$ at a third pitch angle $\alpha_3$, wherein the second pressure $p_2$ is lower than the third pressure $p_3$ and the second pitch angle $\alpha_2$ is smaller than the third pitch angle $\alpha_3$ which is in the exemplary embodiment $\alpha_3$ equal 20°. The third section 213 is determined by a linear interpolation extending from the second pressure $p_2$ at the third pitch angle $\alpha_3$ to a first pressure $p_1$ at a fourth pitch angle $\alpha_4$, wherein the first pressure $p_1$ is lower than the second pressure $p_2$ and the third pitch angle $\alpha_3$ is smaller than the fourth pitch angle $\alpha_4$ which is in the exemplary embodiment $\alpha_4 = 90°$. At the fourth pitch angle $\alpha_4$ equal 90°, the at least one blade 4 is in a stop position. In the stop position at the fourth pitch angle $\alpha_4$ is equal to 90°, the normal of the at least one blade 4 and the incoming wind direction enclose the fourth pitch angle 4 of 90°. In other words, the at least one blade 4 is turned into the wind and the at least one blade 4 of the wind turbine 1 stops to rotate.

As may be seen in FIG. 2 at all times the minimum requirement function 210 is at least on or above the first pressure function 220 of the wind turbine 1.

Figure 3:
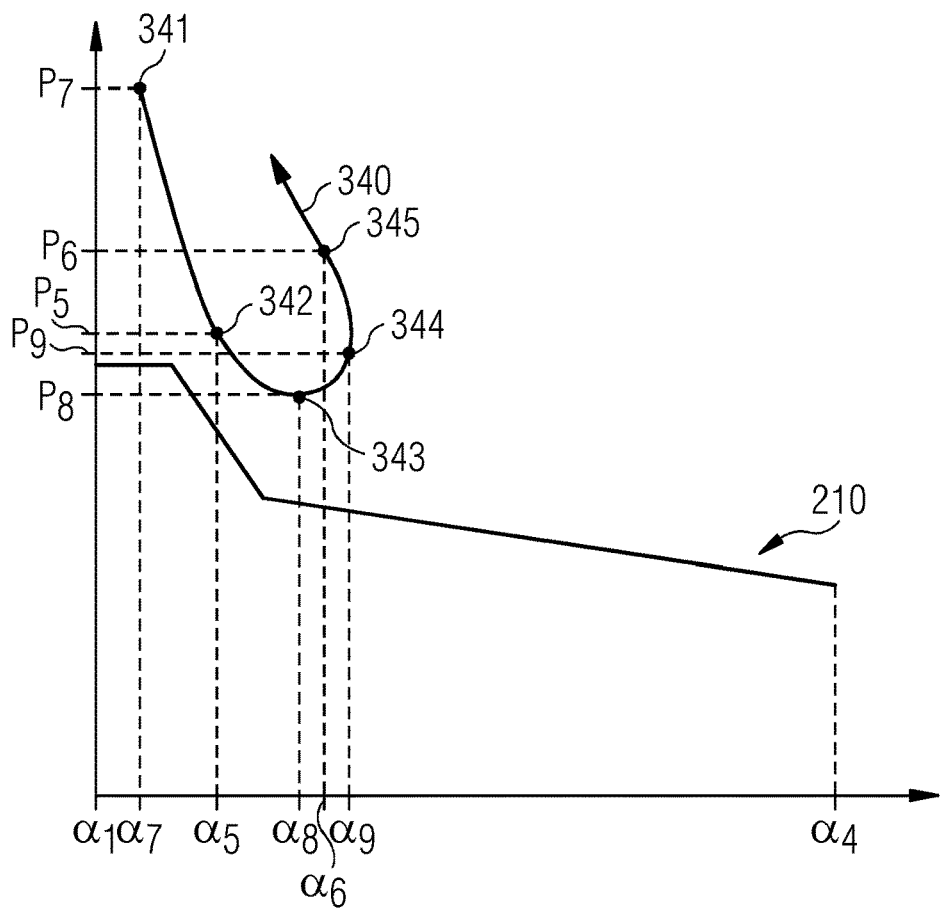
FIG. 3 shows a graph illustrating how controlling of the wind turbine according to an embodiment of the present invention may prevent a shutdown of the wind turbine'.

FIG. 3 shows the minimum requirement function 210 as described above in connection with FIG. 2, and a hydraulic pressure function 340 of the wind turbine 1 representing the hydraulic pressure p required in the at least one accumulator dependent on the pitch angle $\alpha$ of the wind turbine.

The minimum requirement function 210 is determined by the above described section-wise linear interpolation as described above in connection with FIG. 2. The hydraulic pressure function 340 as illustrated in FIG. 3 illustrates the hydraulic pressure p dependent on the pitch angle $\alpha$ of the wind turbine 1. When a gust hits the wind turbine 1 a lot of pitch activity may be required from the controller of the wind turbine 1.

At a first system state 341 a gust hits the wind turbine. The actual pressure at the time when the gust hits the wind turbine 1 is $p_7$ at a pitch angle $\alpha_7$. Due to the gust the at least one blade 4 pitches out and the hydraulic pressure drops from the pressure $p_7$ to a pressure $p_5$ which is below the pressure $p_7$. At the same time due to the pitching out, the pitch angle $\alpha_5$ at a second system state 342 is larger than the pitch angle $\alpha_7$. Due to a detection of the lower pressure $p_5$, at least one pump of the wind turbine 1 activates and starts adding hydraulic pressure into the at least one accumulator. This is illustrated in FIG. 3 in a third system state 343. During the reaction of the wind turbine 1, which takes time, the pressure $p_8$ at the third system state 343 at the pitch angle $\alpha_8$ is lower than the pressure $p_5$ at the second system state 342. At the same time the pitching out continues from the second system state 342 to the third system state 343.

When the gust has past and/or enough pressure is added to the hydraulic accumulators of the wind turbine 1, the pressure increases again from the pressure $p_8$ at the third system state 343 to a pressure $P_9$ at a fourth system state 344. A pitch angle $\alpha_9$ at the fourth system state 344 is larger than the pitch angle as at the third system state 343 due to the reaction time of the wind turbine 1. Afterwards, the pressure further increases to reach a pressure $p_6$ at a fifth system state 345. Additionally, the at least one blade 4 of the wind turbine 1 also pitches in again. Hence, a pitch angle $\alpha_6$ of the at least one blade 4 is smaller than the pitch angle $\alpha_9$ at the fourth system state 344.

All of the hydraulic pressure values of the first system state 341, the second system state 342, the third system state 343, the fourth system state 344 and the fifth system state 345 are above the minimum requirement function 210 such that a shutdown due to too low available hydraulic pressure of the wind turbine 1 may be prevented.

Figure 4:
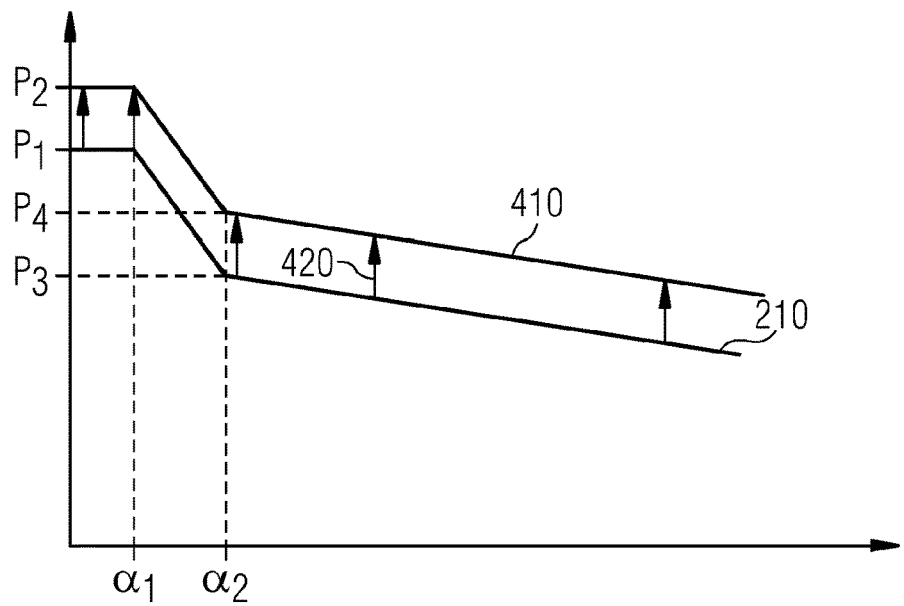
FIG. 4 shows a graph illustrating how controlling of the wind turbine according to a further embodiment of the present invention is operated.

FIG. 4 shows an offset minimum requirement function 410, which may be generated by the controller for controlling the wind turbine 1.

After having generated the minimum requirement function 210 by the controller as described above in connection with FIG. 2, the offset minimum requirement function 410 is determined by the predetermined positive offset 420 being constant and having a value of e.g. 10 bar. The minimum requirement function 210 may be the shutdown level at which the wind turbine shuts down. The offset minimum function may be defined as a predetermined positive offset 420 to the minimum requirement function 210.

The minimum requirement function 210 s section-wise linear and correspondingly the offset minimum requirement function 410 is section-wise linear. Additionally, the predetermined positive offset 420 is constant and therefore a distance between the minimum requirement function 210 and the offset minimum requirement function 410 is constant along the pitch angle $\alpha$.

As illustrated in FIG. 4, at the first pitch angle $\alpha_1$, the minimum requirement function comprises a first pressure $p_1$ and the offset minimum requirement function 410 comprises a second pressure $p_2$ which is offset to the minimum requirement function 210 by the predetermined positive offset 420. The same is true for the second pitch angle as at which the minimum requirement function 210 comprises a third pressure $p_3$ being lower than the first pressure $p_1$ and the second pressure $p_2$, and the offset minimum requirement function 410 comprises a fourth pressure $p_4$ which is offset to the minimum requirement function 210 by the predetermined positive offset 420. The predetermined positive offset 420 at the first pitch angle $\alpha_1$ and the second pitch angle $\alpha_2$ is the same.

Figure 5:
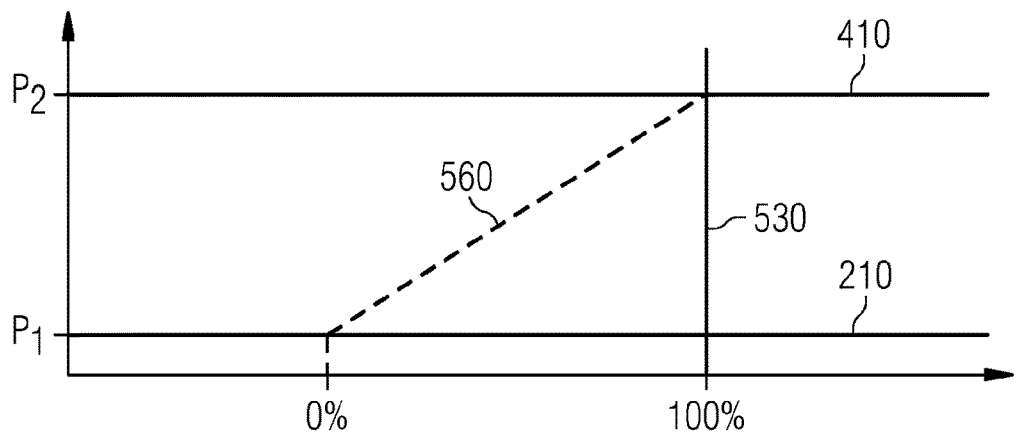
FIG. 5 shows a graph illustrating how adapting of the pitch adjustment speed according to an embodiment of the present invention is operated.

FIG. 5 shows the minimum requirement function 210 and the offset minimum requirement function 410 as described above in connection with FIG. 4. Additionally, a pitch adjustment speed towards a stop position 530 and a pitch adjustment speed towards an operation position 560 is depicted in FIG. 5.

The pitch adjustment speed towards the stop position 530 does not change dependent on the hydraulic pressure and is set to 100%. The pitch adjustment speed towards the operation position 560 is changed/scaled from 100% at a second pressure $p_2$ being the offset minimum required hydraulic pressure to 0% at a first pressure $p_1$ being the minimum required pressure in a linear way.

Figure 6:
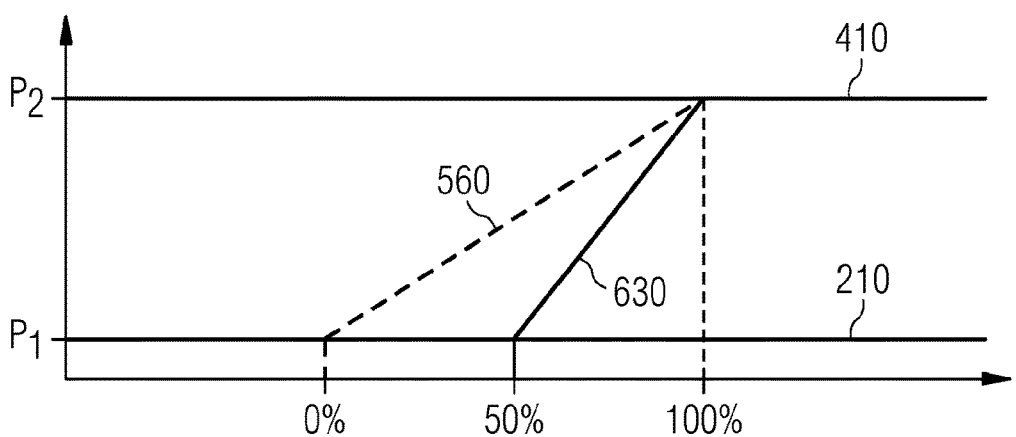
FIG. 6 shows a graph illustrating how adapting of the pitch adjustment speed according to a further embodiment of the present invention is operated.

FIG. 6 shows the minimum requirement function 210 and the offset minimum requirement function 410 as described above in connection with FIG. 4. Additionally, a pitch adjustment speed towards a stop position 630 and the pitch adjustment speed towards an operation position 560 is depicted in FIG. 6.

The pitch adjustment speed towards the operation position 560 is changed/scaled from 100% at a second pressure $p_2$ being the offset minimum required hydraulic pressure to 0% at a first pressure $p_1$ being the minimum required pressure in a linear way. Additionally, a pitch adjustment speed towards the stop position 630 may be reduced to 50% of the nominal pitch adjustment speed as long as operation conditions are considered safe. Hence, the pitch adjustment speed towards the stop position 630 represents a pitching out speed and is changed/scaled from 100% at the second pressure $p_2$ being the offset minimum required hydraulic pressure to 50% at the first pressure $p_1$ being the minimum required pressure in a linear way. Thereby, in a case where the rotor comes close to an overspeed limit, a limitation of the pitch adjustment speed may be removed.

FIG. 7 shows the minimum requirement function 210 as described above in connection with FIG. 2, the offset minimum requirement function 410 as described above in connection with FIG. 4, and a hydraulic pressure function 740 of the wind turbine 1 representing the hydraulic pressure required in the at least one accumulator dependent on the pitch angle $\alpha$ of the wind turbine 1.

In a start-up case the wind turbine 1 starts at a first system state 741 being defined by a first pitch angle $\alpha_1$ of 86° and a first pressure $p_1$ comprising nominal pressure. In a subsequent step, the at least one blade 4 pitches in until a second system state 742 may be reached. The second system state 742 is defined by a second pressure $p_2$ comprising a lower pressure than the first pressure $p_1$, and a second pitch angle $\alpha_2$ of e.g. 60°. At the second system state 742 the pitching stops and hydraulic pressure is added to the at least one accumulator by a at least one hydraulic pump until a third system state 743 is reached which is defined by the second pitch angle $\alpha_2$ and the first pressure $p_1$. Solely if the third system state 743 is reached, the at least one blade 4 will continue to pitch in towards the operation position.

In the case of for example a broken pump or in the case of a slightly under dimensioned hydraulic system, either the at least one accumulator or the at least one hydraulic pump, the at least one hydraulic pump may not keep the pressure above the offset minimum required pressure being defined by the offset minimum requirement function 410. Therefore, a fourth system state 744 is reached defined by a fourth pressure $p_4$ equal to the offset minimum required pressure at a fourth pitch angle $\alpha_4$, and the fourth pitch angle $\alpha_4$. In the following step, the controller controls the wind turbine 1 such that the pitch adjustment speed is slowed down such that the current hydraulic pressure stays above the minimum required hydraulic pressure defined by the minimum requirement function 210. Therefore, a fifth system state 745 is reached, which is defined by a fifth pressure $p_5$ and a fifth pitch angle $\alpha_5$. The fifth pressure $p_5$ is below the offset minimum requirement function 410 and above the minimum requirement function 210. Hence, the wind turbine 1 continued to operate and does not shutdown.

Subsequently, the pitch adjustment speed follows a maximum hydraulic pump capacity present in the wind turbine 1 and further pitches in towards the production position. This is represented by a sixth system state 746 in FIG. 7 defined by a sixth pressure $p_6$ being higher than the fifth pressure $p_5$ and still below the offset minimum required pressure at a sixth pitch angle $\alpha_6$, and the sixth pitch angle $\alpha_6$. At the operation position a seventh system state 747 is reached defined by a seventh pressure $p_7$ being higher than the sixth pressure $p_6$ as well as higher than the offset minimum requirement function 410, and a seventh pitch angle cu equal to the nominal pitch angle at the production position, e.g. 1°.

FIG. 8 shows the minimum requirement function 210 as described above in connection with FIG. 2, the offset minimum requirement function 410 as described above in connection with FIG. 4, and a hydraulic pressure function 840 of the wind turbine 1 representing the hydraulic pressure required in the at least one accumulator dependent on the pitch angle $\alpha$ of the wind turbine.

In the case of a broken hydraulic pump, the wind turbine 1 may produce power in a limping mode to make sure that the availability is higher than with a complete shutdown. Similarly, in the case of a sever gust, where the at least one blade 4 needs to pitch out more than is accounted for in the design of the wind turbine 1, a shutdown may be inhibited.

In a first system state 841 the wind turbine 1 operates in normal operation in the operation position with a first pressure $p_1$ and a first pitch angle $\alpha_1$. Subsequently, when a sever gust hits the at least one blade 4 in normal operation or a small gust hits the at least one blade 4 in the limping mode, the at least one blade 4 pitches out and the wind turbine 1 reaches a second system state 842 defined by a second pressure $p_2$ and a second pitch angle $\alpha_2$. The second pressure $p_2$ being smaller than the offset minimum required hydraulic pressure defined by the offset minimum requirement function 410, and larger than the minimum required hydraulic pressure defined by the minimum requirement function 210. The pitch adjustment speed towards the stop position is not affected and the pressure continues to drop during a pitch out activity of the at least one blade 4. Therefore, a third system state 843 is reached defined by a third pressure $p_3$ being smaller than the second pressure $p_2$, smaller than the offset minimum required hydraulic pressure but still larger than the minimum required hydraulic pressure, and a third pitch angle $\alpha_3$ being larger than the second pitch angle $\alpha_2$.

Subsequently, the pitch adjustment speed towards an operation position is reduced such that the at least one hydraulic pump may be filled with hydraulic pressure again. A fourth system state 844 is reached defined by a fourth pressure $p_4$ and a fourth pitch angle $\alpha_4$. The fourth pressure $p_4$ is larger than the offset minimum required hydraulic pressure defined by the offset minimum requirement function 410, and the fourth pitch angle $\alpha_4$ is smaller than the third pitch angle $\alpha_3$ as well as larger than the second pitch angle $\alpha_2$. The at least one hydraulic pump continues to be filled with hydraulic pressure such that a fifth system state 845 is reached, defined by a fifth pressure $p_5$ and a fifth pitch angle $\alpha_5$ being for example 1°.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a wind turbine, wherein a minimum required hydraulic pressure represents a hydraulic pressure of at least one accumulator of the wind turbine which is required to pitch at least one blade of the wind turbine which is associated with the at least one accumulator into a stop position of the wind turbine, wherein a pitch angle represents a pitch angle of a normal of the at least one blade of the wind turbine relative to an incoming wind direction, the method comprising:
   determining a minimum requirement function of the minimum required hydraulic pressure dependent on the pitch angle;
   determining an offset minimum requirement function being offset to the minimum requirement function by a predetermined positive offset and representing a function of an offset minimum required hydraulic pressure dependent on the pitch angle;
   detecting a current hydraulic pressure in the at least one accumulator at a current pitch angle of the at least one blade;
   determining that the current hydraulic pressure is higher than the minimum required hydraulic pressure at the current pitch angle and lower than the offset minimum required hydraulic pressure at the current pitch angle;
   controlling the wind turbine such that the current hydraulic pressure is above the minimum required hydraulic pressure at the current pitch angle; and
   controlling the wind turbine such that the current hydraulic pressure is above the offset minimum required hydraulic pressure at the current pitch angle.

2. The method according to claim 1, wherein the minimum requirement function is determined by a section-wise linear interpolation and/or a section-wise exponential interpolation.

3. The method according to claim 1, wherein a distance between the minimum requirement function and the offset minimum requirement function is constant along the pitch angle.

4. The method according to claim 1,
   wherein the controlling comprises an adapting of a pitch adjustment speed of at least one blade of the wind turbine.

5. The method according to claim 4, wherein the adapting of the pitch adjustment speed comprises an adapting of the pitch adjustment speed towards a stop position of at least one blade of the wind turbine and/or an adapting of the pitch adjustment speed towards an operation position of the at least one blade of the wind turbine.

6. The method according to claim 4, wherein the adapting of the pitch adjustment speed defines the pitch adjustment speed dependent on the current hydraulic pressure.

7. The method according to claim 6, wherein the pitch adjustment speed dependent on the current hydraulic pressure is changed linearly or exponentially.

8. The method according to claim 4, wherein towards an operation position of the at least one blade of the wind turbine, the pitch adjustment speed changes dependent on the current hydraulic pressure from 100% at the offset minimum required hydraulic pressure to 0% at the minimum required hydraulic pressure.

9. The method according to claim 4, wherein towards a stop position of the at least one blade of the wind turbine, the pitch adjustment speed changes dependent on the current hydraulic pressure from 50% at the offset minimum required hydraulic pressure to 0% at the minimum required hydraulic pressure.

* * * * *